(12) United States Patent
Heikal et al.

(10) Patent No.: US 12,149,539 B2
(45) Date of Patent: Nov. 19, 2024

(54) MANAGING FUNCTIONALITY OF A COMPUTING DEVICE TO INTERACT WITH FIELD EQUIPMENT

(71) Applicant: Charter Communications Operating, LLC, St. Louis, MO (US)

(72) Inventors: Hany Heikal, Aurora, CO (US); Hossam Hmimy, Aurora, CO (US); Mohamed Daoud, Englewood, CO (US); Muhammad Khan, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 299 days.

(21) Appl. No.: 17/731,485

(22) Filed: Apr. 28, 2022

(65) Prior Publication Data

US 2023/0353578 A1 Nov. 2, 2023

(51) Int. Cl.
*H04L 9/40* (2022.01)
*G06K 19/06* (2006.01)
*H04W 64/00* (2009.01)

(52) U.S. Cl.
CPC ...... *H04L 63/107* (2013.01); *G06K 19/06028* (2013.01); *G06K 19/06037* (2013.01); *H04W 64/003* (2013.01)

(58) Field of Classification Search
CPC .............. H04L 63/107; H04W 64/003; G06K 19/06028; G06K 19/0603
See application file for complete search history.

(56) References Cited

U.S. PATENT DOCUMENTS

| | | | | |
|---|---|---|---|---|
| 8,525,681 | B2* | 9/2013 | Gehrke | G08B 21/0286 |
| | | | | 455/456.1 |
| 9,595,049 | B2* | 3/2017 | Showers | G06Q 30/0257 |
| 10,021,108 | B2* | 7/2018 | Mankovskii | H04L 63/105 |
| 10,319,128 | B2* | 6/2019 | Billi-Duran | G06F 3/011 |
| 10,587,683 | B1* | 3/2020 | Ganesan | H04L 67/535 |

(Continued)

OTHER PUBLICATIONS

NPL Search Terms (Year: 2024).*

*Primary Examiner* — Syed A Zaidi
(74) *Attorney, Agent, or Firm* — THE MARBURY LAW GROUP, PLLC

(57) ABSTRACT

Methods performed by a processor of a computing device for managing functionality of the computing device to interact with field equipment may include determining by the processor a location of field equipment based on information obtained by the processor proximate to the field equipment, determining by the processor a location of the computing device based on geolocation information, determining whether the location of the field equipment based on information obtained by the processor proximate to the field equipment and the location of the computing device based on geolocation information are within a threshold distance, verifying the location of the field equipment in response to determining that the location of the field equipment based on information obtained by the processor proximate to the field equipment and the location of the computing device based on geolocation information are within the threshold distance, and enabling functionality of the computing device to interact with the field equipment in response to verifying the location of the field equipment.

27 Claims, 15 Drawing Sheets

(56) References Cited

U.S. PATENT DOCUMENTS

| | | |
|---|---|---|
| 10,900,801 B2 | 1/2021 | Dagley et al. |
| 11,080,885 B2 | 8/2021 | Weller et al. |
| 2015/0227934 A1* | 8/2015 | Chauhan ............ G06Q 20/3224 705/44 |
| 2016/0134642 A1* | 5/2016 | Hamid ................. H04L 63/045 713/160 |
| 2017/0087465 A1 | 3/2017 | Lyons et al. |
| 2018/0062869 A1* | 3/2018 | Nugent .................. H04W 4/80 |
| 2018/0239144 A1 | 8/2018 | Woods et al. |
| 2018/0350150 A1 | 12/2018 | Powderly et al. |
| 2019/0305383 A1* | 10/2019 | Muntes ................ H02J 7/0071 |

* cited by examiner

MANAGING FUNCTIONALITY OF A COMPUTING DEVICE TO INTERACT WITH FIELD EQUIPMENT

BACKGROUND

Maintenance of field equipment, such as light poles, radio poles, radio towers, messenger strand poles, base stations, and the like, is difficult and complex. Field equipment is expensive and is typically deployed over time. Different pieces of equipment may then be upgraded, repaired, or replaced as needed. Thus, deployed field equipment is rarely uniform, but rather may have a variety of hardware components and software components. A technician must be certain to perform the correct diagnostic, repair, and maintenance operations to the hardware and/or software of any particular field equipment. Further, for large-scale operators in particular, it is difficult to maintain accurate information about the hardware and software currently in use in each piece of field equipment. All of these variables pose challenges for technicians in the field performing maintenance operations on field equipment.

SUMMARY

Various aspects include methods that may be implemented on a processor of a computing device for managing functionality of the computing device to interact with field equipment. Various aspects may include determining by the processor of a computing device, a location of field equipment based on information obtained by the processor of the computing device proximate to the field equipment, determining by the processor of the computing device a location of the computing device based on geolocation information, determining whether the location of the field equipment obtained by the processor proximate to the field equipment and the location of the computing device based on geolocation information are within a threshold distance, verifying the location of the field equipment in response to determining that the location of the field equipment represented in an encoded symbol and the location of the computing device based on geolocation information are within the threshold distance, and enabling functionality of the computing device to interact with the field equipment in response to verifying the location of the field equipment.

In some aspects, determining by the processor a location of field equipment based on information obtained by the processor proximate to the field equipment may include determining by the processor a location of field equipment represented in an encoded symbol that is proximate to the field equipment and that is scanned by the computing device. In some aspects, determining by the processor a location of field equipment represented in an encoded symbol that is proximate to the field equipment and that is scanned by the computing device may include obtaining, by the processor, a private key stored in a memory of the computing device, scanning the encoded symbol using a camera of the computing device, obtaining an encrypted location of the field equipment from the encoded symbol, and decrypting the location of the field equipment using the private key.

In some aspects, determining by the processor a location of field equipment based on information obtained by the processor proximate to the field equipment may include receiving the information from the field equipment via a wireless communication signal. In some aspects, determining by the processor a location of field equipment represented in an encoded symbol that is proximate to the field equipment and that is scanned by the computing device may include obtaining by the processor a private key stored in a memory of the computing device, obtaining from the wireless communication signal of the field equipment an encrypted location of the field equipment, and decrypting the location of the field equipment using the private key. In some aspects, determining by the processor a location of the computing device based on geolocation information may include receiving by the processor the location of the computing device based on geolocation information in response to a successful authentication operation.

In some aspects, enabling functionality of the computing device to interact with the field equipment in response to verifying the location of the field equipment may include enabling one or more augmented reality (AR) functions of the computing device to interact with the field equipment in response to verifying the location of the field equipment. In some aspects, enabling functionality of the computing device to interact with the field equipment in response to verifying the location of the field equipment may include receiving from a network computing device information about one or more components of the field equipment that enables the processor to interact with the field equipment. In some aspects, enabling functionality of the computing device to interact with the field equipment in response to verifying the location of the field equipment may include receiving from a network computing device one or more diagnostic tools that enable the processor to interact with the field equipment. In some aspects, enabling functionality of the computing device to interact with the field equipment in response to verifying the location of the field equipment may include receiving from a network computing device a signal that unlocks one or more procedures that enable the processor to interact with the field equipment.

Some aspects may include performing by the processor one or more interactions with the field equipment to perform a diagnostic operation or a maintenance operation on the field equipment. Some aspects may include sending by the processor to a network computing device an indication of an interaction between the processor and the field equipment configured to enable the network computing device to update a record related to the field equipment.

Further aspects may include a processor for use in a computing device configured to perform operations of any of the methods summarized above. Further aspects may include a computing device including means for performing functions of any of the methods summarized above. Further aspects may include a computing device configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
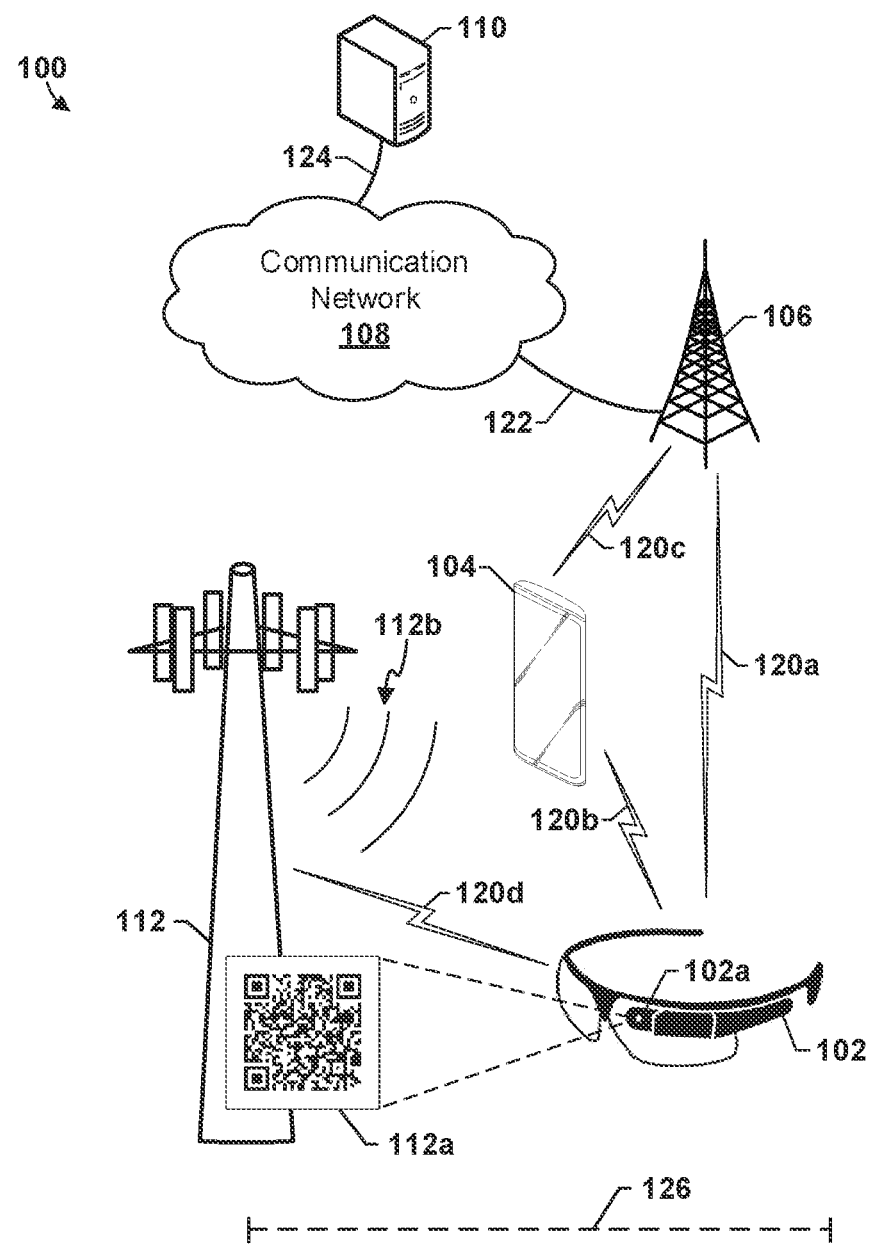
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a computing device for managing functionality of the computing device to interact with field equipment. In various embodiments, the computing device may be configured to interact with field equipment, for example, a light pole, a radio pole, a radio tower, a messenger strand pole, a base station, and other suitable devices (referred to generally herein as "field equipment"). In some embodiments, the computing device may be configured to perform diagnostic operations or maintenance operations on the field equipment. For example, the diagnostic operation or maintenance operation may be configured to repair or upgrade a software or firmware component of the field equipment. In some embodiments, the computing device may be configured to provide diagrams, schematics, and/or instructions to a technician for maintenance or repair operations on a hardware component of the field equipment. In some embodiments, the computing device may include a display device that is configured to provide an augmented reality image that includes information and/or a user interface to the technician that enables the technician to perform various repair, upgrade, diagnostic, maintenance, etc. operations on or for the field equipment. In various embodiments, a processor of the computing device may enable functionality of the computing device to interact with the field equipment in response to verifying an identification of the field equipment, such as verifying that the field equipment is in its correct location.

As used herein, the term "computing device" refers to an electronic device equipped with at least a processor, memory, and a device for presenting output such as a location of an object or objects of interest. In some embodiments, a computing device may include wireless communication devices such as a transceiver and antenna configured to communicate with wireless communication networks. In some embodiments, a computing device may be wearable by a person. A computing device may include any one or all of smart glasses, augmented/virtual reality devices, cellular telephones, smartphones, portable computing devices, personal or mobile multi-media players, laptop computers, tablet computers, 2-in-1 laptop/table computers, smart books, ultrabooks, multimedia Internet-enabled cellular telephones, wearable devices including smart watches and smart contact lenses, entertainment devices (e.g., wireless gaming controllers, music and video players, satellite radios, etc.), and similar electronic devices that include a memory, wireless communication components and a programmable processor. As used herein, the term "smart" in conjunction with a device, refers to a device that includes a processor for automatic operation, for collecting and/or processing of data, and/or may be programmed to perform all or a portion of the operations described with regard to various embodiments. For example, a smart phone, smart glasses, smart contact lenses, smart watch, smart ring, smart necklace, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Maintenance of field equipment presents a variety of challenges. Various deployed field equipment may include or be configured with a variety of hardware and software components, each of which may utilize different diagnostic, repair, and maintenance operations. To perform maintenance on a particular piece of field equipment properly, a technician must use the correct hardware and software tools for the components of that particular field equipment. Incorrectly identifying the field equipment may cause the technician to have the wrong hardware and/or software tools for the components of that particular field equipment. Further, it may be difficult to maintain accurate information about the hardware and software currently in use in each piece of field equipment, in particular for large service providers that may be responsible for hundreds or thousands of pieces of field equipment over a wide geographic area. Additionally, access to field equipment and the identity of the field equipment typically must be restricted for security purposes.

Various embodiments disclosed herein enable and/or provide functionality of a computing device to interact with field equipment. In some embodiments, the computing device may include augmented reality (AR) goggles, a head mounted display (HMD), a pair of smart glasses, or another suitable device configured to provide an augmented reality display that enables the computing device to interact with the field equipment. In some embodiments, the computing device may determine a location of the field equipment based on information obtained by the computing device proximate to the field equipment (e.g., from an information source proximate to the field equipment). For example, the computing device may be configured with a camera or other suitable optical sensor device, which the computing device may control to scan an encoded symbol, such as a barcode, a quick recognition (QR) code, or the like that is installed on or proximate to the field equipment. The computing device may determine a location of the field equipment that is represented in (e.g., encoded in) the encoded symbol. As another example, the computing device may receive a short range wireless communication signal from the field equipment, for example, using a short range communication protocol such as Wi-Fi, Zigbee, Bluetooth, Bluetooth Low Energy (LE), and the like. The computing device may determine a location of the field equipment that is represented in information in the wireless communication signal received from the field equipment.

In some embodiments, the location of the field equipment may be encrypted in a manner such that the location of the field equipment may only be obtained from an encoded symbol or wireless communication signal using an appropriate cryptographic key. In some embodiments, the computing device may determine a location of the field equipment that is encoded and encrypted in the encoded symbol. For example, the computing device may be configured with one or more private keys that may be stored in a memory of the computing device. The computing device may obtain a private encryption key stored in the memory of the computing device. The computing device may scan the encoded symbol using a camera or other optical sensor of the computing device. The computing device may obtain an encrypted location of the field equipment from the encoded symbol, and may decrypt the location of the field equipment using the private key. As another example, the computing device may obtain from the wireless communication signal of the field equipment an encrypted location of the field equipment, and decrypt the location of the field equipment using the private key.

In some embodiments, the computing device may perform one or more operations with a network computing device (such as a server or another suitable remote computing device) to authenticate the computing device (an "authentication operation") before being permitted or enabled to verify the location of the field equipment and/or to interact with the field equipment. In some embodiments, the computing device may communicate with the network computing device via a communication network to perform operation to authenticate the computing device. In some embodiments, in response to receiving a message indicating that the computing device has been authenticated, the computing device may receive a message (e.g., from the network computing device) enabling functionality of the computing device to interact with the field equipment in response to verifying the location of the field equipment.

In some embodiments, the computing device may determine a location of the computing device based on geolocation information. Geolocation information may include, for example, GPS, GPRS, or Galileo signals, base station triangulation using, e.g., signals from a base station such as a cellular base station, or another source of geolocation information. In some embodiments, geolocation information is different from the information obtained by the computing device from a source proximate to the field equipment.

In some embodiments, the computing device may communicate with a second computing device configured to communicate with the network computing device via the communication network (e.g., a cellular telephone, a smart phone, or another suitable mobile communication device). In some embodiments, the second computing device may perform operation(s) with the network computing device to authenticate the second computing device and/or the computing device (i.e., an authentication operation). In some embodiments, in response to the second computing device successfully performing the authentication operation with the network computing device, the computing device may receive from the second computing device geolocation information from the second computing device. In some embodiments, the geolocation information may be determined by the second computing device (e.g., via satellite signals, base station triangulation, or another suitable source of geolocation information).

In some embodiments, the computing device may determine whether the location of the field equipment and the location of the computing device based on geolocation information are within a threshold distance. In some embodiments, the threshold distance may indicate whether the field equipment is at or proximate to the location purported by the location information in the encoded symbol. In some embodiments, the computing device may determine a distance between the location of the field equipment and the location of the computing device based on geolocation information, and may determine whether the determined distance is within the distance threshold. In some embodiments, the computing device may verify the location of the field equipment in response to determining that the location of the field equipment and the location of the computing device based on geolocation information are within the threshold distance.

In some embodiments, in response to verifying the location of the field equipment, the computing device may enable functionality of the computing device to interact with the field equipment. In some embodiments, in response to verifying the location of the field equipment, the computing device may enable one or more augmented reality (AR) functions of the computing device to interact with the field equipment. The AR functions may include including or combining virtual images and/or text together with a view of the real world in a display device of the computing device. In some embodiments, the computing device may receive from a network computing device (e.g., a server) information about one or more components of the field equipment that enables the processor to interact with the field equipment. In some embodiments, the computing device may receive from a network computing device one or more diagnostic tools that enable the processor to interact with the field equipment. In some embodiments the computing device may receive software code that includes such diagnostic tools. In some embodiments the computing device may receive software code that includes a software update or firmware update for the field equipment, which the computing device may install in the field equipment. In some embodiments, the computing device may receive a code or signal from the network computing device that unlocks or enables diagnostic tools or other functionality on the computing device for interaction with the field equipment. In some embodiments, the computing device may receive a code or signal from the network computing device that unlocks one or more procedures (e.g., repair procedures, maintenance procedures, diagnostic procedures, etc.) that enable the processor to interact with the field equipment.

In some embodiments, the computing device may perform one or more interactions with the field equipment to perform a diagnostic operation or a maintenance operation on the field equipment. In some embodiments, the computing device may send to a network computing device an indication of an interaction between the processor and the field equipment configured to enable the network computing device to update a record related to the field equipment. In this manner, a network operator or field equipment operator may obtain up-to-date information of the location, hardware components, and software components of deployed field equipment.

FIG. 1 is a system block diagram illustrating an example communications system 100 suitable for implementing various embodiments. The communication system 100 may include a computing device 102, an auxiliary computing device 104, a base station 106, a communication network 108, and a network computing device 110. In some embodiments, the computing device 102 may be equipped with an optical sensor 102a, such as a camera or another suitable device.

The base station 106 may provide wireless communications to access the communication network 108 over a wired and/or wireless communication backhaul 122. The base station 106 may include base stations configured to provide wireless communications over a wide area (e.g., macro cells), as well as small cells, which may include a micro cell, a femto cell, a pico cell, and other similar network access points.

The computing device 102 and the base station 106 may communicate via a wireless communication link 120a. The computing device 102 and the auxiliary computing device 104 may communicate via a wireless communication link 120b. The auxiliary computing device 104 and the base station 106 may communicate via a wireless communication link 120c. The computing device 102 and the field equipment 112 may communicate via a wireless communication link 120d. The wireless communication links 120a, 120b, 120c, and 120d may include a plurality of carrier signals, frequencies, or frequency bands, each of which may include a plurality of logical channels. The wireless communication links 120a-120d may utilize one or more radio access technologies (RATs). Examples of RATs that may be used in a wireless communication link in various embodiments include medium range protocols such as Wi-Fi, LTE-U, LTE-Direct, LAA, MuLTEfire, and relatively short range RATs such as ZigBee, Bluetooth, and Bluetooth Low Energy (LE). However, such examples should not be considered limiting. For example, embodiments are also possible in which a wireless communication link uses other RATs, such as 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs.

The network computing device 110 may include a network server or another similar network element. The network computing device 110 may communicate with the communication network 108 over a communication link 124. The computing device 102 and the network computing device 110 may communicate via the communication network 108. The network computing device 110 may provide the computing device 102 with information, instructions, messages, software code, or other suitable information relevant to operations of the computing device 102 and/or the field equipment 112.

In some embodiments, the computing device 102 may perform one or more operations with the network computing device 110 to authenticate the computing device 102. In some embodiments, the computing device 102 may communicate with the network computing device 110 via the communication network 108 to perform operations to authenticate the computing device 102. In this way, the network computing device 110 may insure that information regarding field equipment 112 is shared with authenticated devices. In some embodiments, the auxiliary computing device 104 may communicate with the network computing device 110 via the communication network 108 to perform operations to authenticate the auxiliary computing device 104 and/or the computing device 102. The auxiliary computing device 104 may include a processor with enhanced processing capabilities, memory storage and/or battery life than the computing device 102. By including the auxiliary computing device 104 in some embodiments, many processing functions that would be performed by the computing device 102 may be offloaded to the auxiliary computing device 104. As noted above, in some embodiments, in response to the auxiliary computing device 104 successfully performing the authentication operation with the network computing device 110, the computing device 102 may receive geolocation information from the auxiliary computing device 104. In some embodiments, the geolocation information may be determined by the auxiliary computing device 104 (e.g., via satellite signals, base station triangulation, or another suitable source of geolocation information).

In some embodiments, the computing device 102 may determine whether the location of the field equipment 112 and the location of the computing device 102 based on geolocation information are within a threshold distance 126 of one another. In some embodiments, the threshold distance 126 may indicate whether the field equipment 112 is at or proximate to the location purported by the location information obtained proximate to the field equipment 112, such as the encoded symbol 112a or the short range wireless communication signal 112b. In some embodiments, the computing device 102 may determine a distance between the location of the field equipment 112 and the location of the computing device 102 based on geolocation information, and may determine whether the determined distance is within the distance threshold 126. In some embodiments, the computing device 102 may verify the location of the field equipment 112 in response to determining that the location of the field equipment 112 and the location of the computing device 102 based on geolocation information are within the threshold distance 126 of one another and of the recorded location of the field equipment 112.

In various embodiments, the computing device 102 may be configured to interact with field equipment 112. The computing device 102 may include AR goggles, a head mounted display (HMD), a smart glasses, or another suitable device configured to provide an augmented reality display that enables the computing device to interact with the field equipment 112. In some embodiments, the field equipment 112 may be configured with an encoded symbol 112a affixed either directly on or proximate to the field equipment 112. The encoded symbol 112a may be a barcode, a quick recognition (QR) code, or the like. The computing device 102 may scan the encoded symbol 112a using the optical sensor 102a. In some embodiments, the computing device 102 may determine the location of the field equipment 112 that is represented in (e.g., encoded in) the encoded symbol 112a. In some embodiments, the field equipment 112 may transmit or broadcast a short range wireless communication signal 112b using a short range communication protocol such as Wi-Fi, Zigbee, Bluetooth, Bluetooth Low Energy (LE), and the like. In such embodiments, the computing device 102 may determine a location of the field equipment 112 that is represented in information in the wireless communication signal 112b. Further operations, aspects, and implementations regarding the computing device 102 are described below.

Figure 2:
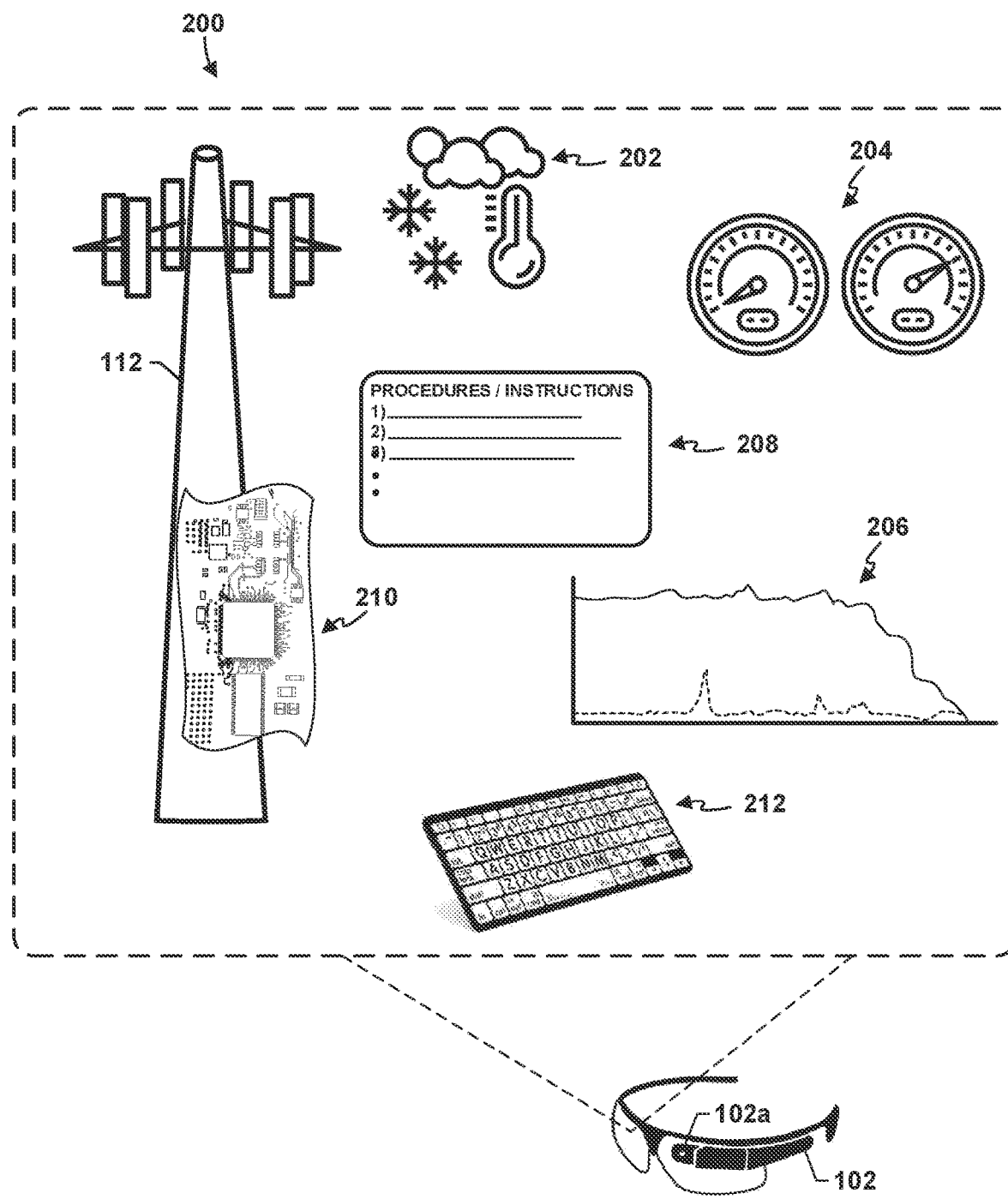
FIG. 2 is a block diagram illustrating an example augmented reality (AR) image suitable for implementing various embodiments.

FIG. 2 is a block diagram illustrating an example augmented reality (AR) image 200 suitable for implementing various embodiments. With reference to FIGS. 1 and 2, the computing device 102 may be include a display device configured to display the AR image 200. The AR image 200 may include various virtual images included with or superimposed on image(s) of the real world. For example, the AR image 200 may include a real-world view of the field equipment 112. The AR image 200 also may include variety of virtual images that provide information related to the field equipment 112. For example, the AR image 200 may include various weather information or information about the ambient environment 202. As another example, the AR image 200 may include dashboard information 204 that provides information about the operations and/or functions of the field equipment 112, for example, CPU utilization, memory utilization, disk utilization, and/or other information related to the operations and/or functions of the field equipment 112. As another example, the AR image 200 may include dashboard information over time 206 that provides information about the utilization by the field equipment 112 of one or more computing or communication resources of the field equipment 112 over time.

As another example, the AR image 200 may include procedures or instructions 208. In some embodiments, the procedures or instructions 208 may include text, images, video, interactive images, and the like, that provide an operator of the computing device 102 with information for controlling the computing device 102 to interact with the field equipment. In some embodiments, the procedures or instructions 208 may include maintenance or repair procedures for a hardware or software component of the field equipment 112. In some embodiments, the procedures or instructions 208 may include images or interactive images illustrating repair procedures for a hardware or software component of the field equipment 112.

As another example, the AR image 200 may include a virtual image of hardware or software components 210 of the field equipment 112. In some embodiments, the computing device 102 may change the display of the virtual image of hardware or software components 210 based on an orientation of the computing device 102 relative to the field equipment 112. For example, as the computing device 102 is moved around the field equipment 112, or as the camera device 102a of the computing device 102 is directed at different portions or aspects of the field equipment 112, the computing device 102 may alter, change, move, rotate, etc. the virtual image of the hardware or software components 210 corresponding with the relative orientation of the computing device 102 or the field of view of the camera device 102a.

In some embodiments, the AR image 200 may include a virtual keyboard 212 or other suitable virtual input device. The virtual keyboard 212 may be configured to receive inputs and/or instructions that correspond with code, commands, signals, procedures, etc., including various maintenance or repair procedures for the field equipment 112.

Figure 3:
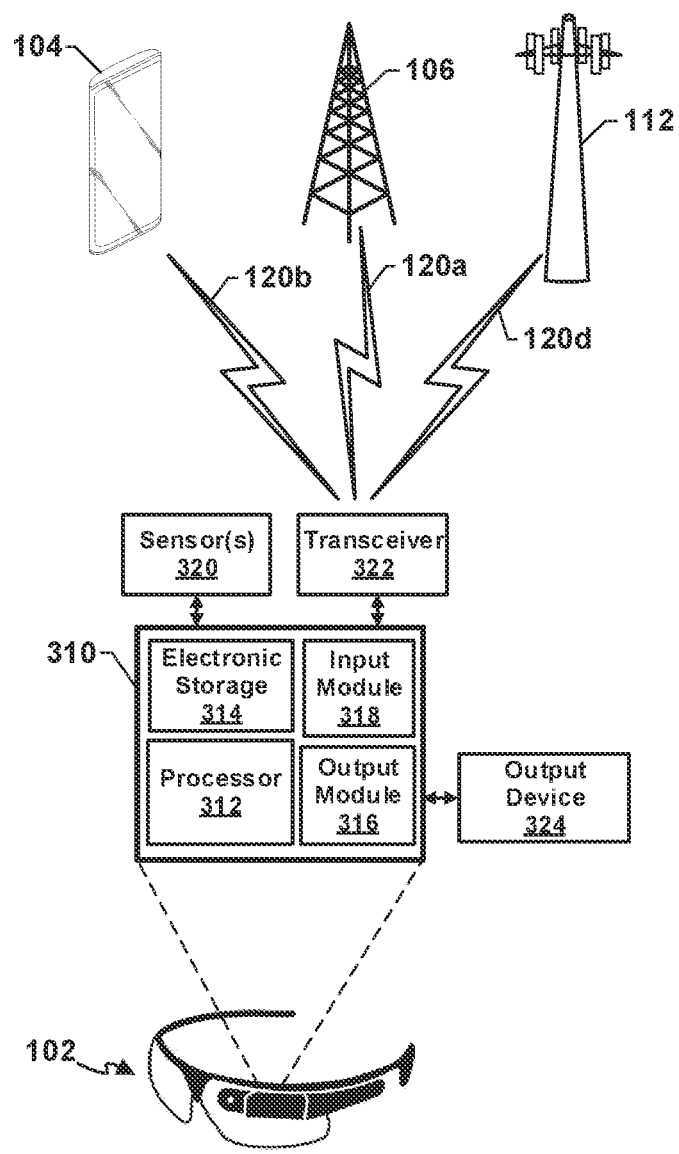
FIG. 3 is a component block diagram illustrating a processing device suitable for use in computing devices implementing various embodiments.

FIG. 3 is a component block diagram illustrating a processing device 310 suitable for use in a computing device implementing various embodiments. With reference to FIGS. 1-3, the computing device 102 may include a control unit 310. The control unit 310 may include various circuits, devices, and/or functions used to control operations thereof. For example, the control unit 310 may include a processor 312, electronic storage 314 (i.e., memory), an input module 318, and an output module 316. In addition, the control unit 310 may be coupled to a transceiver 322 for transmitting and/or receiving wireless communications (e.g., with auxiliary computing device 104, base station 106, and/or field equipment 112 via communication links 120a, 120b, 102d as described), one or more sensors 320 (e.g., camera 102a), and an output device 324 such as a display device, a sound output device (e.g., a speaker), a haptic feedback device, etc. In various embodiments, the output device 324 may be configured to generate and output an AR display.

The processing device 310 may be configured to determine by the processor 312 a location of field equipment 112 based on information obtained by the processor 312 proximate to the field equipment 112. The processing device 310 may be configured to determine by the processor 312 a location of the computing device 102 based on geolocation information. The processing device 310 may be configured to determine whether the location of the field equipment 112 and the location of the computing device 102 are within a threshold distance (e.g., 126) of one another. The processing device 310 may be configured to verify the location of the field equipment 112 in response to determining that the location of the field equipment 112 based on information obtained by the processor 312 proximate to the field equipment 112 and the location of the computing device 102 based on geolocation information are within the threshold distance of one another. The processing device 310 may be configured to enable functionality of the computing device 102 to interact with the field equipment 112 in response to verifying the location of the field equipment 112.

Figure 4:
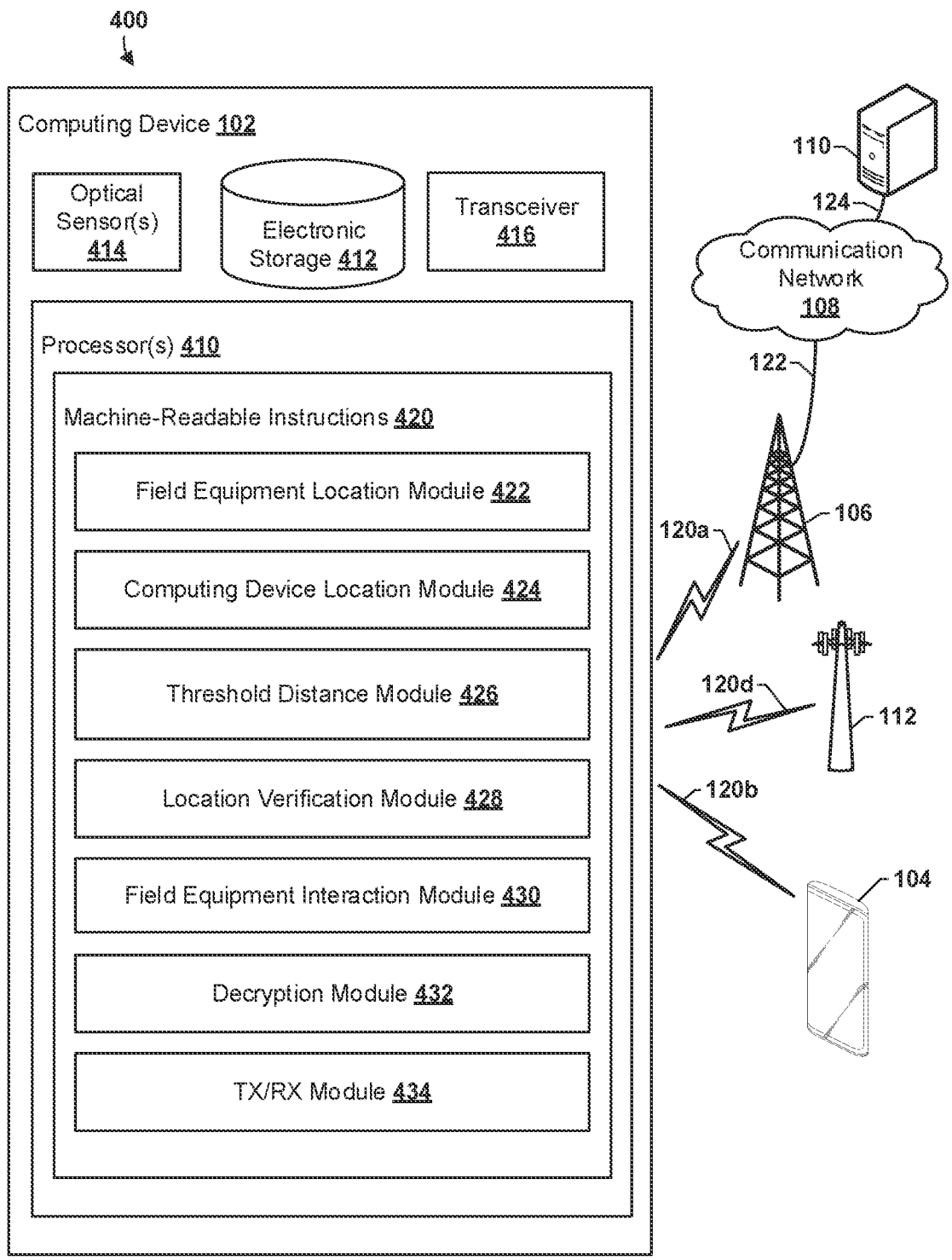
FIG. 4 is a component block diagram illustrating a system configured for managing functionality of the computing device to interact with field equipment in accordance with various embodiments.

FIG. 4 is a component block diagram illustrating a system 400 configured for managing functionality of the computing device to interact with field equipment in accordance with various embodiments. With reference to FIGS. 1-4, the system 400 may include a computing device 102, access point 106, an auxiliary computing device 104, and/or computing device 120.

The computing device 102 may include one or more processors 410, electronic storage 412, one or more optical sensor(s) 414 (e.g., the camera 102a), a transceiver 416 (e.g., wireless transceiver), and other components. The computing device 102 may include a plurality of hardware, software, and/or firmware components operating together to provide the functionality attributed herein to the computing device 410.

Electronic storage 412 may include non-transitory storage media that electronically stores information. The electronic storage media of electronic storage 412 may include one or both of system storage that is provided integrally (i.e., substantially non-removable) with the computing device 102 and/or removable storage that is removably connectable to the computing device 102 via, for example, a port (e.g., a universal serial bus (USB) port, a firewire port, etc.) or a drive (e.g., a disk drive, etc.). In various embodiments, electronic storage 412 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Electronic storage 412 may include one or more virtual storage resources (e.g., cloud storage, a virtual private network, and/or other virtual storage resources). Electronic storage 412 may store software algorithms, information determined by processor(s) 410, information received from the computing device 140, information received from network computing device 110, and/or other information that enables the computing device 102 to function as described herein.

Processor(s) 410 may include one of more local processors (e.g., 312), which may be configured to provide information processing capabilities in the computing device 102. As such, processor(s) 410 may include one or more of a digital processor, an analog processor, a digital circuit designed to process information, an analog circuit designed to process information, a state machine, and/or other mechanisms for electronically processing information. Although processor(s) 410 is shown in FIG. 4 as a single entity, this is for illustrative purposes only. In some embodiments, processor(s) 410 may include a plurality of processing units. These processing units may be physically located within the same device, or processor(s) 410 may represent processing functionality of a plurality of devices operating in coordination.

The computing device 102 may be configured by machine-readable instructions 420, which may include one or more instruction modules. The instruction modules may include computer program modules. In various embodiments, the instruction modules may include one or more of a field equipment location module 422, a computing device location module 424, a threshold distance module 426, a location verification module 428, a field equipment interaction module 430, a decryption module 432, and a transmit/receive (TX/RX) module 434.

The field equipment location module 422 may be configured to determine a location of the field equipment 112 based on information obtained proximate to the field equipment 112. The field equipment location module 422 may be configured to determine a location of field equipment 112 represented in an encoded symbol 112a that is affixed on or proximate to the field equipment 112 and that is scanned by the computing device 102. The field equipment location module 422 may be configured to receive the information from the field equipment 112 via a wireless communication signal (in some embodiments, together with the TX/RX module 434).

The computing device location module 424 may be configured to determine a location of the computing device 102 based on geolocation information. The computing device location module 424 may be configured to receive by the processor (410, 312) the location of the computing device 102 based on geolocation information in response to a successful authentication operation.

The threshold distance module 426 may be configured to determine whether the location of the field equipment 112 based on information obtained proximate to the field equipment 112 and the location of the computing device 102 based on geolocation information are within a threshold distance (e.g., 126) of one another.

The location verification module 428 may be configured to verify the location of the field equipment 112 in response to determining that the location of the field equipment 112 based on information obtained proximate to the field equipment 112 and the location of the computing device 102 based on geolocation information are within the threshold distance.

The field equipment interaction module 430 may be configured to enable functionality of the computing device 102 to interact with the field equipment 112 in response to verifying the location of the field equipment 112. The field equipment interaction module 430 may be configured to enable one or more AR functions of the computing device 102 to interact with the field equipment 112 in response to verifying the location of the field equipment 112. The field equipment interaction module 430 may be configured to enable receive from a network computing device (e.g., 110) information about one or more components of the field equipment 112 that enables the processor (e.g., 410) to interact with the field equipment 112. The field equipment interaction module 430 may be configured to enable receive from a network computing device (e.g., 110) one or more diagnostic tools that enable the processor 410 to interact with the field equipment 112. The field equipment interaction module 430 may be configured to enable receive from the network computing device 110 a signal that unlocks one or more procedures that enable the processor 410 to interact with the field equipment 112. The field equipment interaction module 430 may be configured to perform a diagnostic operation or a maintenance operation on the field equipment 112. The field equipment interaction module 430 may be configured to send by the processor 410 to a network computing device 110 an indication of the interaction between the processor 410 and the field equipment 112 configured to enable the network computing device 110 to update a record related to the field equipment.

The decryption module 432 may be configured to obtain by the processor 410 a private key stored in a memory (e.g., 412) of the computing device 102, scan an encoded symbol 112a using a camera (e.g., 320) of the computing device 102, obtain an encrypted location of the field equipment 112 from the encoded symbol 112a, and decrypt the location of the field equipment 112 using the private key. The decryption module 432 may be configured to obtain by the processor the private key stored in the memory (e.g., 412) of the computing device 102, obtain from a wireless communication signal of the field equipment 112 an encrypted location of the field equipment 112, and decrypt the location of the field equipment 112 using the private key.

The TX/RX module 434 may be configured to control wireless communication of the computing device 102, e.g., with the auxiliary computing device 104, the field equipment 112, or the base station 106, via the transceiver 416.

The processor(s) 410 may be configured to execute the modules 422-434 and/or other modules by software, hardware, firmware, some combination of software, hardware, and/or firmware, and/or other mechanisms for configuring processing capabilities on processor(s) 410.

The description of the functionality provided by the different modules 422-434 is for illustrative purposes, and is not intended to be limiting, as any of modules 422-434 may provide more or less functionality than is described. For example, one or more of modules 422-434 may be eliminated, and some or all of its functionality may be provided by other ones of modules 422-434. As another example, processor(s) 410 may be configured to execute one or more additional modules that may perform some or all of the functionality attributed below to one of modules 422-434.

Figure 5:
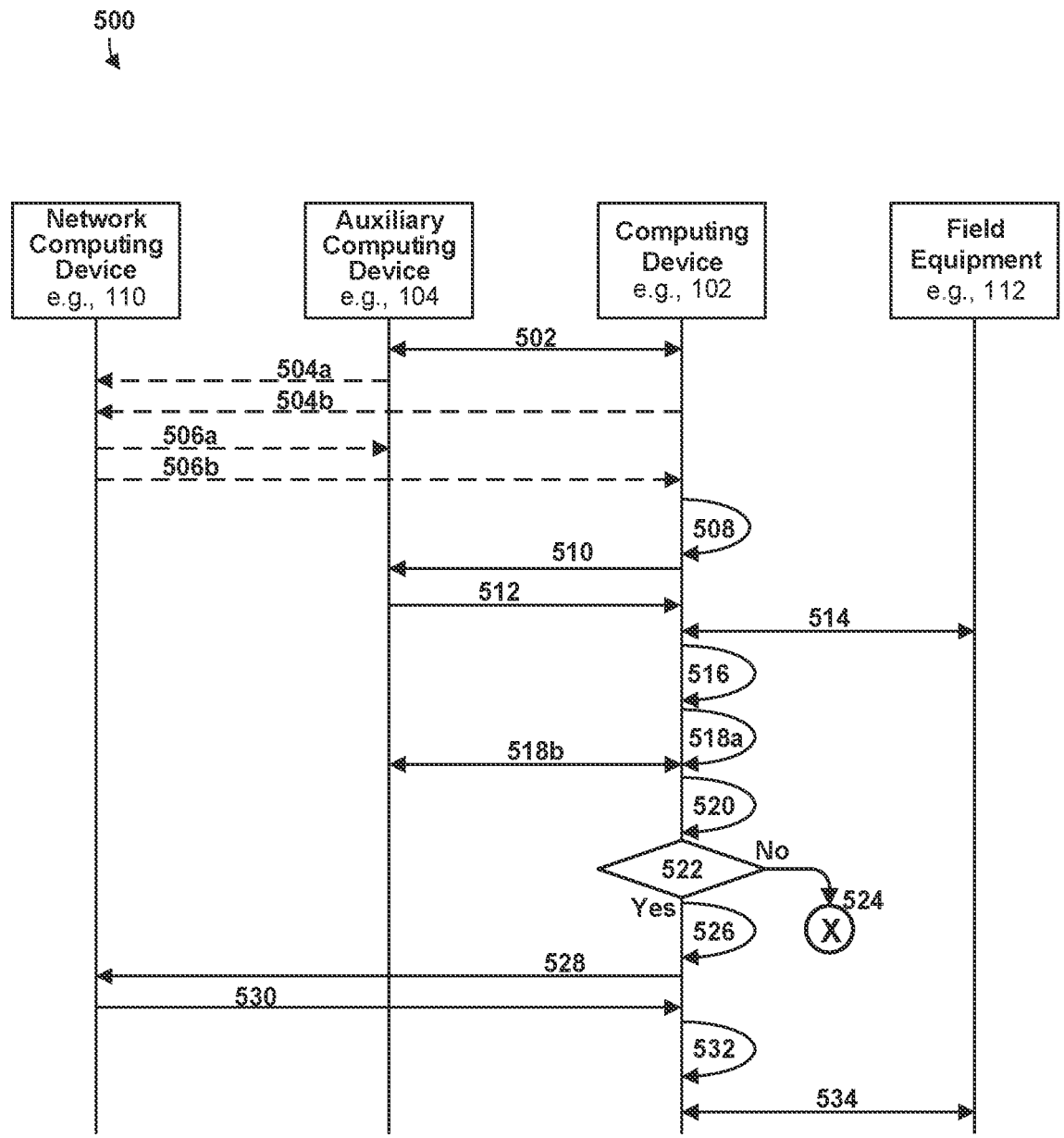
FIG. 5 is a message flow diagram illustrating an operations 500 that may be performed as part of the method for managing functionality of the computing device to interact with field equipment according to various embodiments.

FIG. 5 is a message flow diagram illustrating an operations 500 that may be performed as part of the method for managing functionality of the computing device 102 to interact with field equipment 112 according to various embodiments. With reference to FIGS. 1-5, the operations 500 may be performed by a processor (e.g., 312, 410) of a computing device (e.g., 102), an auxiliary computing device (e.g., 104), a network computing device (e.g., 110), and field equipment (e.g., 112).

The computing device 102 and the auxiliary computing device 104 may establish a wireless communication link 502 using, for example, a short range communication protocol. In some embodiments, the auxiliary computing device 104 may initiate an authentication operation by sending an authorization request message 504a to the network computing device 110. In some embodiments, the computing device 102 may initiate an authentication operation by sending an authorization request message 504b to the network computing device 110. In some embodiments, the authorization request message 504a or 504b may include a user name, a password, and a device identifier (for example, an Integrated Services Digital Network (ISDN) number or another suitable unique identifier). In some embodiments, the computing device 102 may send the authorization request message 504b or the auxiliary computing device 104 may send the authorization request message 504a after arriving in proximity to the field equipment 112. In some embodiments, the computing device 102 may send the authorization request message 504b or the auxiliary computing device 104 may send the authorization request message 504a before arriving in proximity to the field equipment 112, to perform a "pre-authentication" with the network computing device 110. In some embodiments, as part of operations related to such a pre-authentication, the computing device 102 or the auxiliary computing device 104 may include with the authorization request message 504a, 504b an indication of an identity of the field equipment 112, as an indication that the computing device 102 and/or the auxiliary computing device 104 will be used to interact with the field equipment 112.

In some embodiments, in response to determining that the auxiliary computing device 104 is successfully authenticated, the network computing device 110 may send to the auxiliary computing device 104 an authorization success message 506a. In other embodiments, in response to determining that the computing device 102 is successfully authenticated, the network computing device 110 may send to the auxiliary computing device 104 an authorization success message 506b.

In some embodiments, the computing device 102 may initialize an application or service 508 for interacting with the field equipment 112. In some embodiments, the application or service may include an AR application or service. In some embodiments, the auxiliary computing device 104 may be provided with a unique identifier (e.g., ISDN) number to the network computing device 110, the computing device 102 may send (e.g., at the instruction of the application or service 508) to the auxiliary computing device 104 a request message 510 for the device identifier of the auxiliary computing device 104. The auxiliary computing device 104 may send the unique identifier to the computing device 102 in a response message 512.

In some embodiments, the second computing device 102 may perform an operation 514 to determine a location of the field equipment 112 based on information obtained by the computing device 102 proximate to the field equipment 112. In some embodiments, the computing device 102 may determine a location of field equipment 112 represented in an encoded symbol 112a that is proximate to the field equipment 112. The computing device 102 may scan the encoded symbol 112a and may use information encoded in the symbol 112a to determine the location of the field equipment 112. In some embodiments, the computing device 102 may receive information from the field equipment 112 in a wireless communication signal, and the computing device 102 may use information in the wireless communication signal to determine the location of the field equipment 112.

In some embodiments, the computing device 102 may perform decryption operations 516 to determine the location of the field equipment. In some embodiments, the computing device 102 may obtain an encrypted location of the field equipment 112 from the encoded symbol 112a. The computing device 102 (or auxiliary computing device 104) may decrypt the location of the field equipment 112 using a private key stored in a memory (314, 412) of the computing device 102. In some embodiments, the computing device 102 may obtain from the wireless communication signal from the field equipment 112 an encrypted location of the field equipment 112, and may decrypt the location of the field equipment 112 received in the wireless communication signal using the private key.

In some embodiments, the computing device 102 may perform location operations to determine a location of the computing device 102 based on geolocation information. In some embodiments, the computing device 102 may use a computing device location module 424 of the computing device 102 to determine 518a the computing device 102 location. For example, the computing device 102 may use GPS, GPRS, or Galileo signals, or may perform base station triangulation operations, or may perform other location determining operations, to determine the location of the computing device 102. In some embodiments, the computing device 102 may send a location request 518b to the auxiliary computing device 104. In some embodiments, the geolocation information may be determined by the auxiliary computing device 104 (e.g., via satellite signals, base station triangulation, or another suitable source of geolocation information). In some embodiments, in response to the auxiliary computing device 104 successfully performing the authentication operations with the network computing device 112, the auxiliary computing device 104 may send to the computing device 102 the geolocation information (e.g., determined by the auxiliary computing device 104).

In some embodiments, the computing device 102 may determine 520 a distance between the location of the field equipment 112 based on the information obtained proximate to the field equipment 112 and the location of the computing device 102 based on geolocation information. In determination block 522, the computing device 102 may determine whether the location of the field equipment 112 based on information obtained by the processor (312, 410) proximate to the field equipment 112 and the location of the computing device 102 based on geolocation information are within a threshold distance to one another. In some embodiments, the computing device 102 may determine whether the distance 520 is less than (or less than or equal to) a threshold distance.

In response to determining that that the location of the field equipment 112 based on information obtained by the processor (312, 410) proximate to the field equipment 112 and the location of the computing device 102 based on geolocation information are not within the threshold distance (i.e., determination block 522="No"), the processor (312, 410) may not verify the location of the field equipment 112. In some embodiments, the computing device 102 may block or may not enable 524 functionality of the computing device 102 to interact with the field equipment 112. In response to determining that the location of the field equipment 112 based on information obtained by the processor proximate to the field equipment 112 and the location of the computing device 102 based on geolocation information are within the threshold distance to one another (i.e., determination block 522="Yes"), the processor may verify 526 the location of the field equipment 112.

In some embodiments, the computing device 102 may send a message 528 to the network computing device 110 indicating that the computing device 102 has verified the location of the field equipment 112. In some embodiments, the message 528 may include a request or other message that may cause the network computing device 110 to send information that the computing device 102 may use to interact with the field equipment 112. In some embodiments, the field equipment 112 may send a message 530 in response to the message 528. In some embodiments, the message 530 may include one or more diagnostic tools that enable the processor to interact with the field equipment 112. In some embodiments, the message 530 may include software code that includes a software update or firmware update for the field equipment 112. In some embodiments, the message 530 may include a code or signal that unlocks or enables diagnostic tools or other functionality on the computing device 102 for interaction with the field equipment 112. In some embodiments, the message 530 may include a code or signal from the network computing device 110 that unlocks one or more procedures (e.g., repair procedures, maintenance procedures, diagnostic procedures, etc.) that enable computing device 102 to interact with the field equipment 112.

In some embodiments, the computing device 102 may enable 532 one or more functionalities of the computing device 102 to interact with the field equipment 112 in message 534. In some embodiments, the computing device 102 may enable 532 one or more functionalities of the computing device 102 to enable interactions with the field equipment 112 in message 534 in response to the message 530 from the network computing device 110. In some embodiments, in response to verifying the location of the field equipment 112, the computing device 102 may enable functionality of the computing device 102 to interact with the field equipment 112.

The computing device 102 may then interact 534 with the field equipment 112. In some embodiments, the computing device 102 may perform one or more interactions with the field equipment 112 to perform a diagnostic operation or a maintenance operation on the field equipment 112.

Figure 6A:
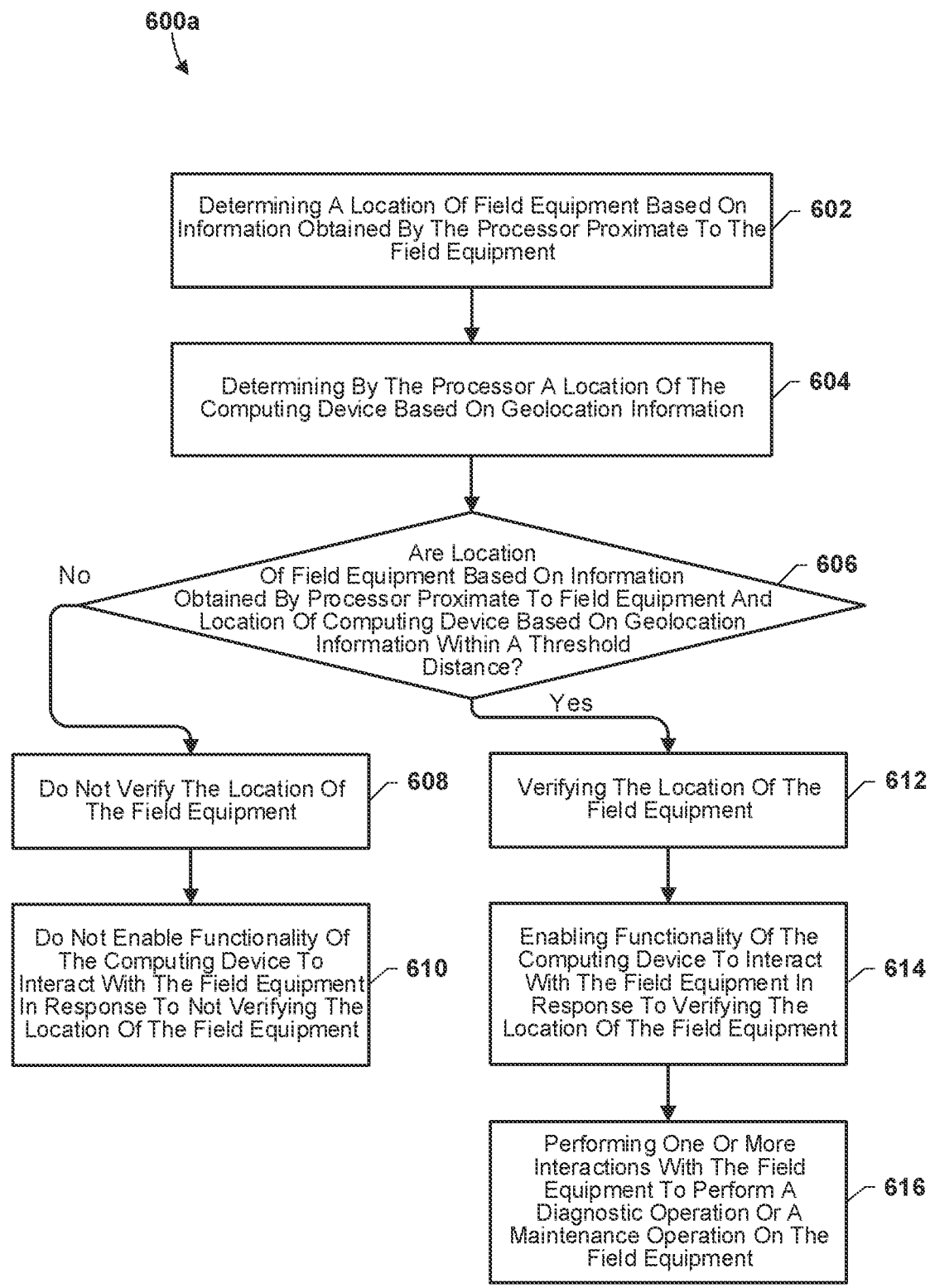
FIG. 6A is a process flow diagram illustrating an example method 600a that may be performed by a processor of a computing device for managing functionality of the computing device to interact with field equipment according to various embodiments.

FIG. 6A is a process flow diagram illustrating an example method 600a that may be performed by a processor (312, 410) of a computing device 102 for managing functionality of the computing device 102 to interact with field equipment 112 according to various embodiments. With reference to FIGS. 1-6A, means for performing each of the operations of the method 600a may be a processor (e.g., 312, 410) of the computing device (e.g., 102) and/or the like.

In block 602, the processor (312, 410) may determine a location of field equipment 112 based on information obtained by the processor (312, 410) while the processor is located proximate to the field equipment 112. In some embodiments, the processor (312, 410) may be configured with a camera 102a or other suitable optical sensor device 320, which the computing device 102 may control to scan an encoded symbol 112a, such as a barcode, a QR code, or the like. The processor (312, 410) may determine a location of the field equipment 112 that is represented in (e.g., encoded in) the encoded symbol 112a. In some embodiments, the processor (312, 410) may receive a short range wireless communication signal from the field equipment 112, for example, using a short range communication protocol such as Wi-Fi, Zigbee, Bluetooth, Bluetooth Low Energy (LE), and the like. The processor (312, 410) may determine a location of the field equipment 112 that is represented in information in the wireless communication signal received from the field equipment 112.

In block 604, the processor (312, 410) may determine a location of the computing device 102 based on geolocation information. In some embodiments, geolocation information may include, for example, GPS, GPRS, or Galileo signals, base station triangulation using, e.g., signals from a base station such as a cellular base station, or another source of geolocation information.

In determination block 606, the processor (312, 410) may determine whether the location of the field equipment 112 based on information obtained by the processor (312, 410) while it is located proximate to the field equipment 112 and the location of the computing device 102 based on geolocation information are within a threshold distance of one another. In some embodiments, the threshold distance may indicate whether the field equipment 112 is at or proximate to the location purported by the location information in the encoded symbol 112a. In some embodiments, the computing device 102 may determine a distance between the location of the field equipment 112 and the location of the computing device 102 based on geolocation information, and may determine whether the determined distance is within the distance threshold.

In response to determining that the location of the field equipment 112 based on information obtained by the processor (312, 410) while located proximate to the field equipment 112 and the location of the computing device 102 based on geolocation information are not within the threshold distance (i.e., determination block 606="No"), the processor (312, 410) may not verify the location of the field equipment 112 in block 608.

In block 610, in response to not verifying the location of the field equipment 112, the processor (312, 410) may not enable functionality of the computing device 102 to interact with the field equipment 112. In this manner, the computing device 102 may be enabled to interact with the field equipment 112 only in instances in which the location of the field equipment 112 is verified.

In response to determining that the location of the field equipment 112 based on information obtained by the processor (312, 410) while located proximate to the field equipment 112 and the location of the computing device 102 based on geolocation information are within the threshold distance to one another (i.e., determination block 606="Yes") the processor (312, 410) may verify the location of the field equipment 112 in block 612.

In block 614, the processor (312, 410) may enable functionality of the computing device 102 to interact with the field equipment 112 in response to verifying the location of the field equipment 112.

In block 616, the processor (312, 410) may perform one or more interactions with the field equipment 112 to perform a diagnostic operation or a maintenance operation on the field equipment 112. In some embodiments, the processor (312, 410) may perform the interaction(s) with the field equipment 112 using the enabled functionality of the computing device 102. In this manner, the computing device 102 may be enabled to interact with the field equipment 112 only in instances in which the location of the field equipment 112 is verified.

FIGS. 6B-6H are process flow diagrams illustrating operations 600b-600h that may be performed by a processing device 410 of a computing device 102 as part of the method 600a for providing a location of an object or objects of interest according to various embodiments. With reference to FIGS. 1-6H, means for performing the operations 600b-600h may be a processor (e.g., 312, 410) of the computing device (e.g., 102) and/or the like.

Figure 6B:
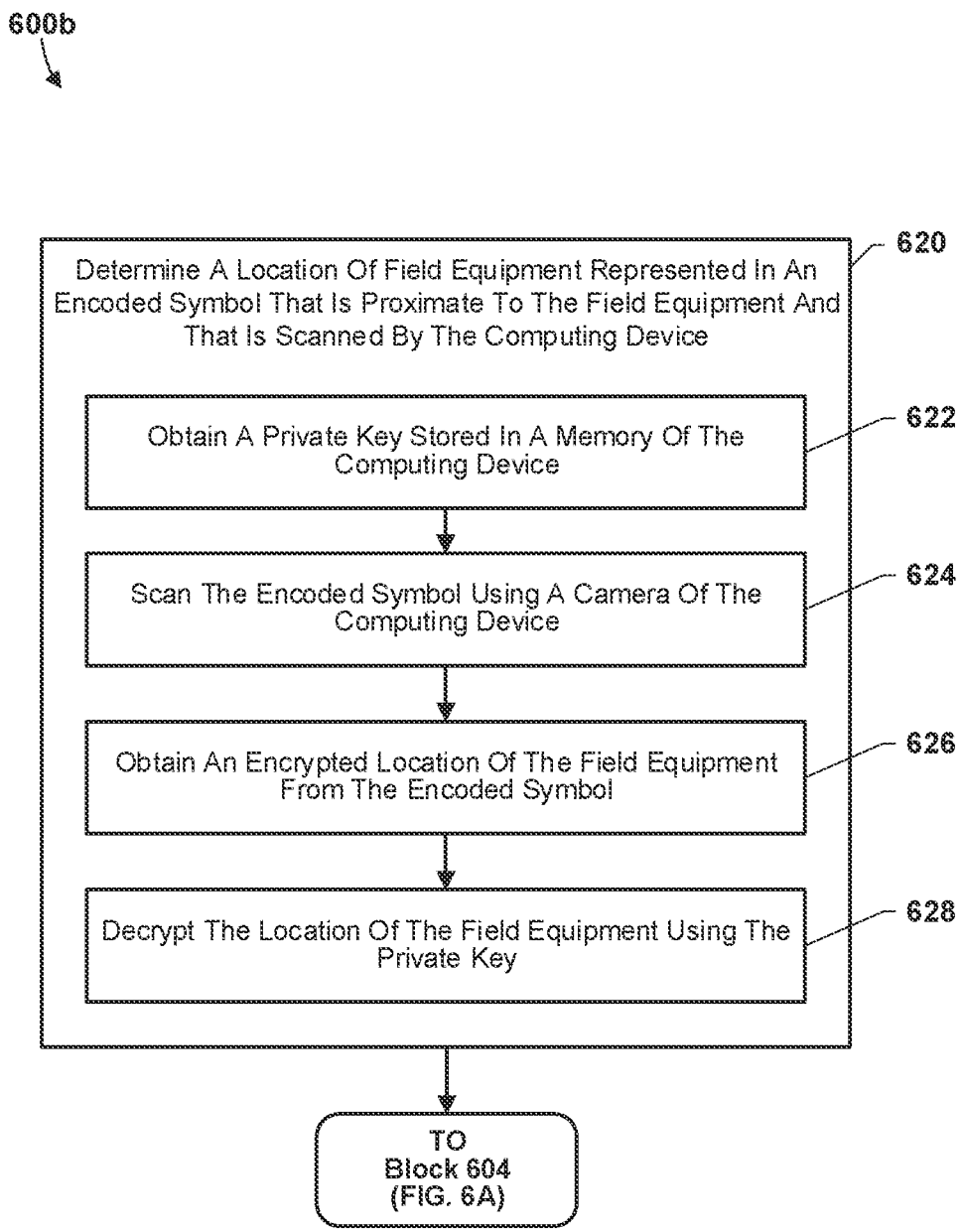
FIGS. 6B-6H are process flow diagrams illustrating operations that may be performed by a processing device of a computing device as part of the method for providing a location of an object or objects of interest according to various embodiments.

With reference to FIG. 6B, the operations 600b are an example of operations that may be performed as part of the operations of block 602 (FIG. 6A). In block 620, the processor (312, 410) may determine a location of field equipment 112 represented in an encoded symbol 112a that is proximate to the field equipment 112 and that is scanned by the computing device 102.

In some embodiments, the operations of block 620 may include the operations of blocks 622-628. In block 622, the processor (312, 410) may obtain a private key stored in a memory (314, 412) of the computing device 102. For example, the computing device 102 may be configured with one or more private cryptographic keys or private encryption keys that may be stored in a memory (312. 410) of the computing device 102 that the computing device 102 may obtain, retrieve, derive, and/or the like.

In block 624, the processor (312, 410) may scan the encoded symbol 112a using a camera 102a of the computing device 102. For example, the computing device 102 may scan a barcode, QR code, or another suitable encoded symbol using a camera 102a or other optical sensor 320 of the computing device 102.

In block 626, the processor (312, 410) may obtain an encrypted location of the field equipment 112 from the encoded symbol 112a. For example, the processor (312, 410) may decode from the encoded symbol information for an encrypted location of the field equipment 112. In this manner, while the encoded symbol 112a may be scanned by any device suitably configured to scan encoded symbols, such device may only obtain encrypted location information that is not usable or readable without performing decryption using an appropriate private key or cryptographic key.

In block 628, the processor (312, 410) may decrypt the location of the field equipment 112 using the private key. For example, the processor (312, 410) may apply the private key to the encrypted location information in a decryption operation to decrypt the location information of the field equipment 112.

After performing the operations of block 628, the processor (312, 410) may determine a location of the computing device 102 based on geolocation information in block 604 (FIG. 6A) as described.

Figure 6C:
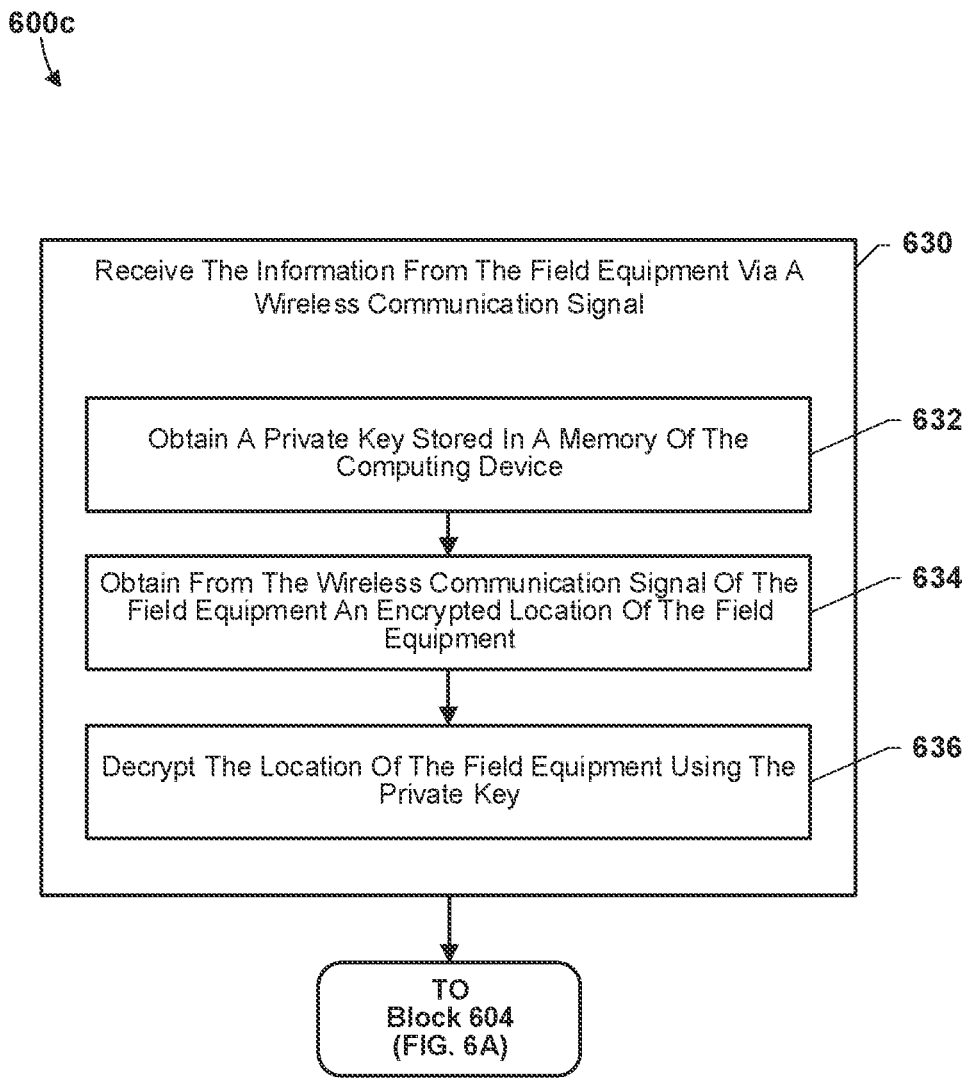

With reference to FIG. 6C, the operations 600c are an example of operations that may be performed as part of the operations of block 602 (FIG. 6A). In block 630, the processor (312, 410) may receive the information from the field equipment via a wireless communication signal.

In some embodiments, the operations of block 630 may include the operations of blocks 632-636. In block 632, the processor (312, 410) may obtain a private key stored in a memory (314, 412) of the computing device 102.

In block 634, the processor (312, 410) may obtain from the wireless communication signal of the field equipment 112 an encrypted location of the field equipment 112. For example, the wireless communication signal may include one or more symbols, packets, or other information or signals that include or represent the encrypted location of the field equipment 112.

In block 636, the processor (312, 410) may decrypt the location of the field equipment 112 using the private key. For example, the processor (312, 410) may apply the private key to the encrypted location information in a decryption operation to decrypt the location information of the field equipment 112.

After performing the operations of block 636, the processor (312, 410) may determine a location of the computing device 102 based on geolocation information in block 604 (FIG. 6A) as described.

Figure 6D:
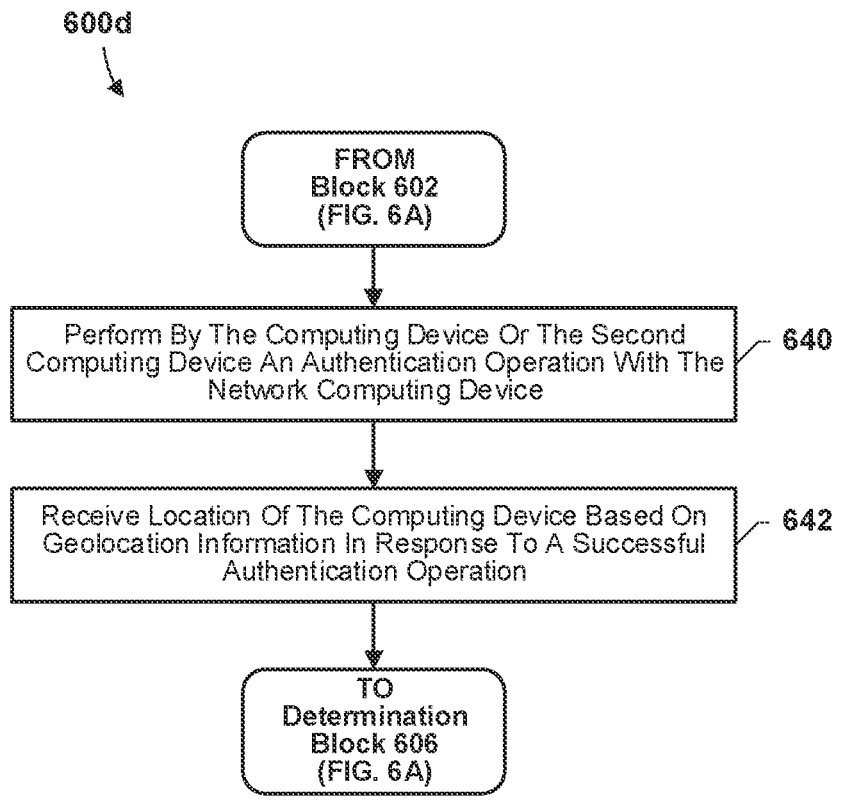

With reference to FIG. 6D, after determining a location of field equipment based on information obtained by the processor (312, 410) that is proximate to the field equipment 112 in block 602 as described, the processor (312, 410) of the computing device 102, or a processor of the auxiliary computing device (e.g., 104), may perform an authentication operation with the network computing device 110 in block 640. For example, the computing device 102 or the auxiliary computing device 104 may perform an authentication operation with the network computing device 110. The authentication operation may determine whether the computing device 102 or the auxiliary computing device 104 is authorized to communicate with the network computing device 110 and/or the field equipment (e.g., 112).

In block 642, the processor (i.e., of the computing device) may receive the location of the computing device 102 based on geolocation information in response to a successful authentication operation. In some embodiments, the auxiliary computing device 104 may send the location information to the computing device 102 in response to the auxiliary computing device 104 receiving a message from the network computing device 110 indicating a successful authentication operation (e.g., an authorization success message).

The processor (i.e., of the computing device) may then determine whether the location of the field equipment 112 based on information obtained by the processor (312, 410) proximate to the field equipment 112 and the location of the computing device 102 based on geolocation information are within a threshold distance to one another in block 606 (FIG. 6A) as described.

Figure 6E:
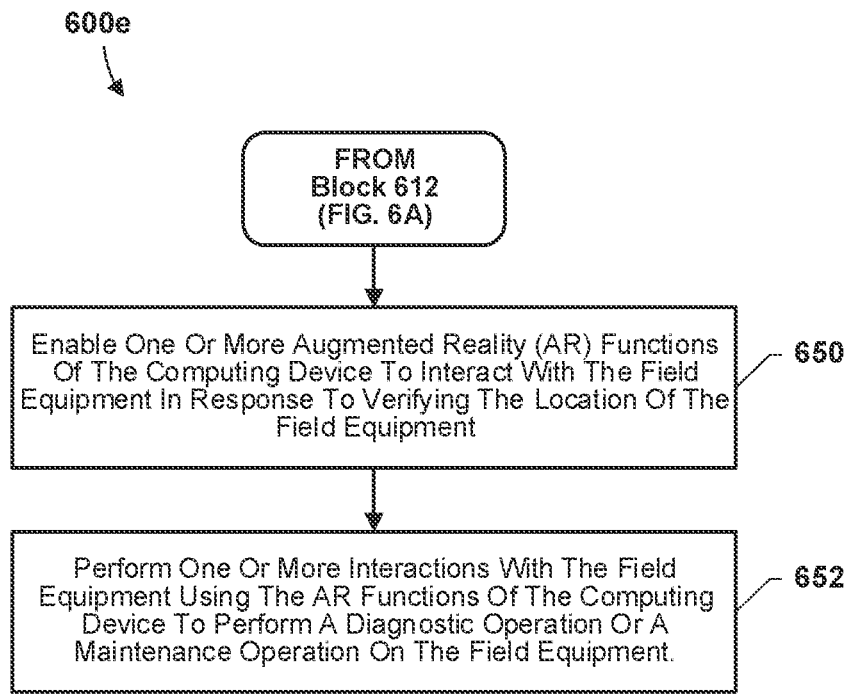

With reference to FIG. 6E, in response to verifying the location of the field equipment 112 in block 612 (FIG. 6A) as described, the processor (312, 410) may enable one or more AR functions of the computing device 102 to interact with the field equipment 112 in block 650.

In block 652, the processor (312, 410) may perform one or more interactions with the with the field equipment 112 using the AR functions of the computing device 102 to perform a diagnostic operation or a maintenance operation on the field equipment 112.

Figure 6F:
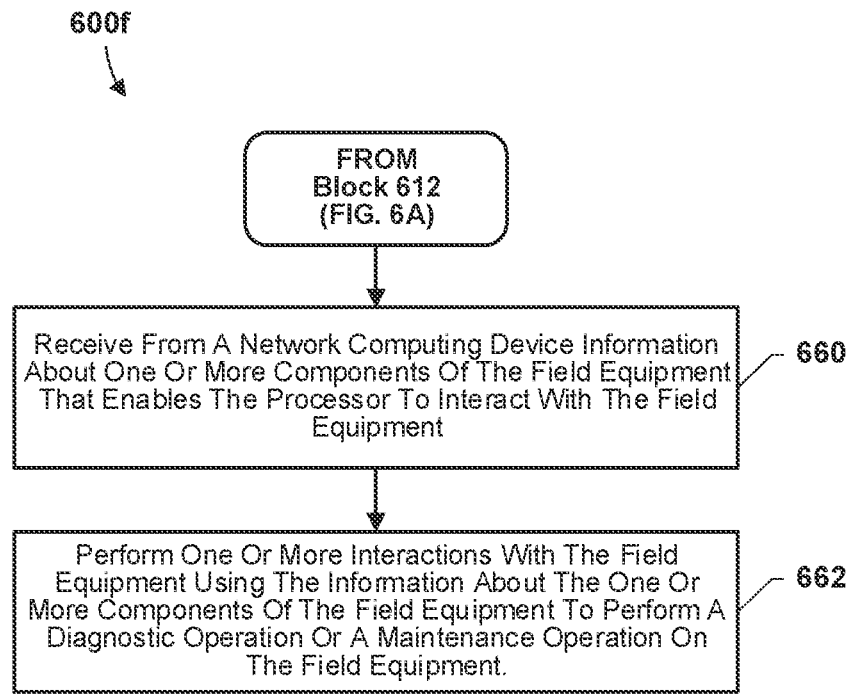

With reference to FIG. 6F, in response to verifying the location of the field equipment 112 in block 612 (FIG. 6A) as described, the processor (312, 410) may receive from the network computing device 110 information about one or more components of the field equipment 112 that enables the processor (312, 410) to interact with the field equipment 112 in block 660.

In block 662, the processor (312, 410) may perform one or more interactions with the field equipment 112 using the information about the one or more components of the field equipment 112 to perform a diagnostic operation or a maintenance operation on the field equipment 112.

Figure 6G:
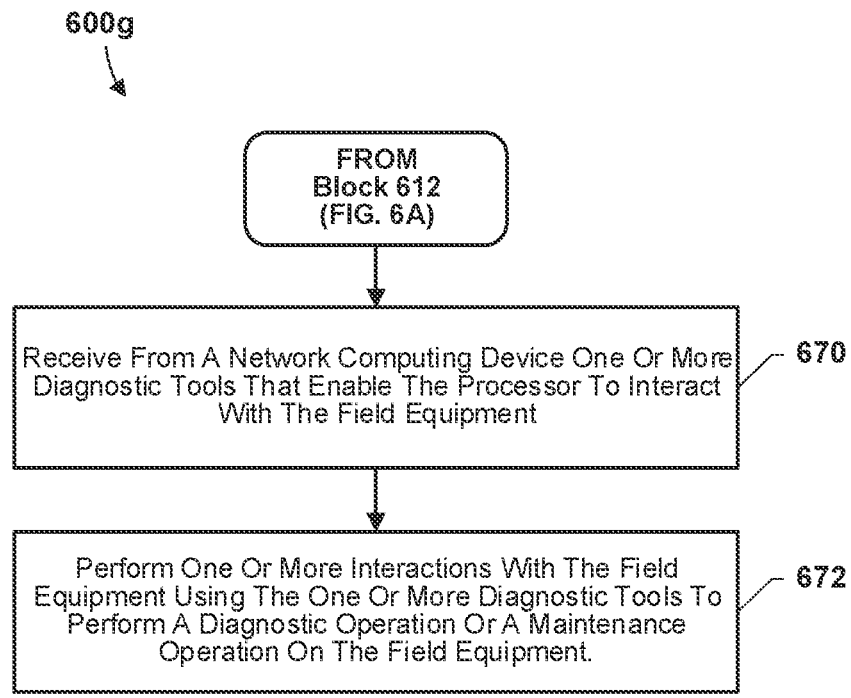

With reference to FIG. 6G, in response to verifying the location of the field equipment 112 in block 612 (FIG. 6A) as described, the processor (312, 410) may receiving from a network computing device 110 one or more diagnostic tools that enable the processor (312, 410) to interact with the field equipment 112 in block 670.

In block 672, the processor (312, 410) may perform one or more interactions with the field equipment 112 using the one or more diagnostic tools to perform a diagnostic operation or a maintenance operation on the field equipment 112.

Figure 6H:
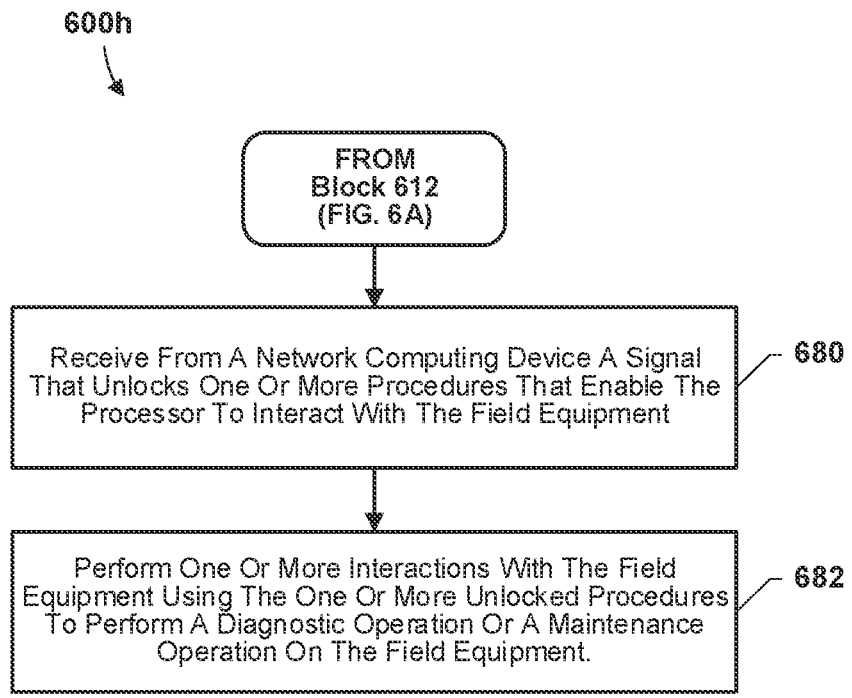

With reference to FIG. 6H, in response to verifying the location of the field equipment 112 in block 612 (FIG. 6A) as described, the processor (312, 410) may receive from a network computing device 110 a signal that unlocks one or more procedures that enable the processor (312, 410) to interact with the field equipment 112 in block 680.

In block 682, the processor (312, 410) may perform one or more interactions with the field equipment 112 using the one or more unlocked procedures to perform a diagnostic operation or a maintenance operation on the field equipment 112.

Figure 7:
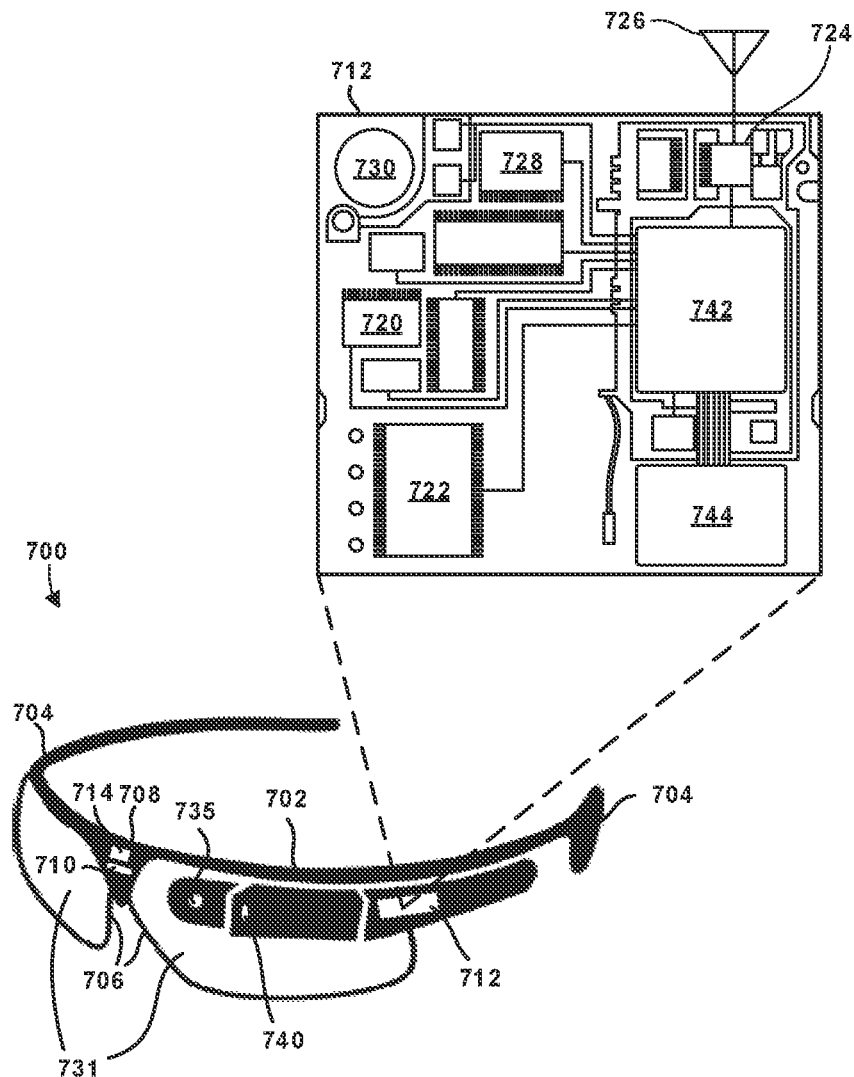
FIG. 7 is a component block diagram of a computing device suitable for use with various embodiments.

FIG. 7 is a component block diagram of a computing device 102 suitable for use with various embodiments. With reference to FIGS. 1-7, various embodiments (including embodiments discussed above with reference to FIGS. 1-6H) may be implemented on a variety of computing devices, an example of which is illustrated in FIG. 7 in the form of smart glasses 700. The smart glasses 700 may operate like conventional eye glasses, but with enhanced computer features and sensors, like a built-in camera 735 and heads-up display or AR features on or near the lenses 731. Like any glasses, smart glasses 700 may include a frame 702 coupled to temples 704 that fit alongside the head and behind the ears of a wearer. The frame 702 holds the lenses 731 in place before the wearer's eyes when nose pads 706 on the bridge 708 rest on the wearer's nose.

In some embodiments, smart glasses 700 may include an image rendering device 714 (e.g., an image projector), which may be embedded in one or both temples 704 of the frame 702 and configured to project images onto the optical lenses 731. In some embodiments, the image rendering device 714 may include a light-emitting diode (LED) module, a light tunnel, a homogenizing lens, an optical display, a fold mirror, or other components well known projectors or head-mounted displays. In some embodiments (e.g., those in which the image rendering device 714 is not included or used), the optical lenses 731 may be, or may include, see-through or partially see-through electronic displays. In some embodiments, the optical lenses 731 include image-producing elements, such as see-through Organic Light-Emitting Diode (OLED) display elements or liquid crystal on silicon (LCOS) display elements. In some embodiments, the optical lenses 731 may include independent left-eye and right-eye display elements. In some embodiments, the optical lenses 731 may include or operate as a light guide for delivering light from the display elements to the eyes of a wearer.

The smart glasses 700 may include a number of external sensors that may be configured to obtain information about wearer actions and external conditions that may be useful for sensing images, sounds, muscle motions and other phenomenon that may be useful for detecting when the wearer is interacting with a virtual user interface as described. In some embodiments, smart glasses 700 may include a camera 735 configured to image objects in front of the wearer in still images or a video stream. Additionally, the smart glasses 700 may include a lidar sensor 740 or other ranging device. In some embodiments, the smart glasses 700 may include a microphone 710 positioned and configured to record sounds in the vicinity of the wearer. In some embodiments, multiple microphones may be positioned in different locations on the frame 702, such as on a distal end of the temples 704 near the jaw, to record sounds made when a user taps a selecting object on a hand, and the like. In some embodiments, smart glasses 700 may include pressure sensors, such on the nose pads 706, configured to sense facial movements for calibrating distance measurements. In some embodiments, smart glasses 700 may include other sensors (e.g., a thermometer, heart rate monitor, body temperature sensor, pulse oximeter, etc.) for collecting information pertaining to environment and/or user conditions that may be useful for recognizing an interaction by a user with a virtual user interface The smart glasses 700 may include a processing system 712 that includes processing and communication SOCs 742, 744 which may include one or more processors (e.g., 312, 410) one or more of which may be configured with processor-executable instructions to perform operations of various embodiments. The processing and communications SOCs 742, 744 may be coupled to internal sensors 720, internal memory 722, and communication circuitry 724 coupled one or more antenna 726 for establishing a wireless data link (e.g., with field equipment 112, auxiliary computing device 104, or base station 106). The processing and communication SOCs 742, 744 may also be coupled to sensor interface circuitry 728 configured to control and received data from a camera 735, microphone(s) 710, and other sensors positioned on the frame 702.

The internal sensors 720 may include an inertial measurement unit (IMU) that includes electronic gyroscopes, accelerometers, and a magnetic compass configured to measure movements and orientation of the wearer's head. The internal sensors 720 may further include a magnetometer, an altimeter, an odometer, and an atmospheric pressure sensor, as well as other sensors useful for determining the orientation and motions of the smart glasses 700. The processing system 712 may further include a power source such as a rechargeable battery 730 coupled to the SOCs 742, 744 as well as the external sensors on the frame 702.

Figure 8:
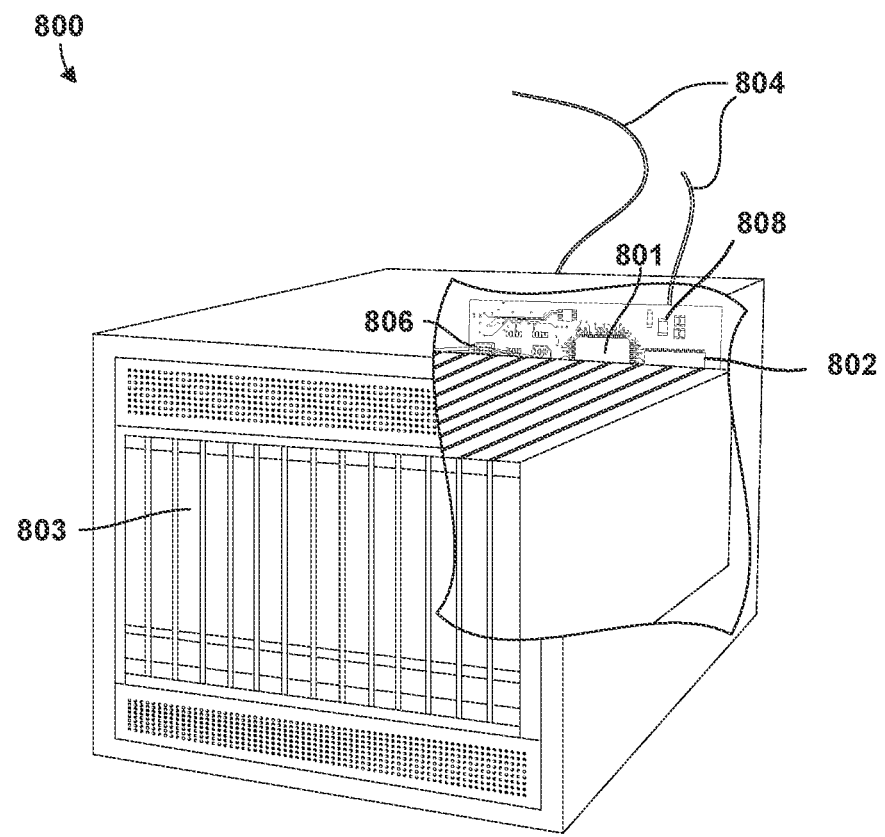
FIG. 8 is a component block diagram of a network computing device suitable for use with various embodiments.

FIG. 8 is a component block diagram of a network computing device 110 suitable for use with various embodiments. With reference to FIGS. 1-8, various embodiments (including, but not limited to, embodiments discussed above with reference to FIGS. 1-6H) may be implemented on a variety of network computing devices, an example of which is illustrated in FIG. 8 in the form of a network computing device 800. The network computing device 800 may include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more transceivers 808 for sending and receiving electromagnetic radiation that may be connected to a wireless communication link. The network computing device 800 may include additional access ports, such as USB, Firewire, Thunderbolt, and the like for coupling to peripherals, external memory, or other devices.

The processors implementing various embodiments may be any programmable microprocessor, microcomputer or multiple processor chip or chips that can be configured by software instructions (applications) to perform a variety of functions, including the functions of the various embodiments described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device for managing functionality of the computing device to interact with field equipment, comprising:
   determining, by the processor, a location of field equipment based on information obtained by the processor proximate to the field equipment, wherein determining a location of field equipment based on information obtained by the processor proximate to the field equipment comprises determining by the processor a location of field equipment represented in an encoded symbol that is proximate to the field equipment and that is scanned by the computing device;
   determining, by the processor, a location of the computing device based on geolocation information, wherein the geolocation information is different from the information obtained by the processor proximate to the field equipment;
   determining whether the location of the field equipment based on information obtained by the processor proximate to the field equipment and the location of the computing device based on geolocation information are within a threshold distance to one another;
   verifying the location of the field equipment in response to determining that the location of the field equipment based on information obtained by the processor proximate to the field equipment and the location of the computing device based on geolocation information are within the threshold distance; and
   enabling functionality of the computing device to interact with the field equipment in response to verifying the location of the field equipment.

2. The method of claim 1, wherein determining by the processor a location of field equipment represented in an encoded symbol that is proximate to the field equipment and that is scanned by the computing device comprises:
   obtaining, by the processor, a private key stored in a memory of the computing device;
   scanning the encoded symbol using a camera of the computing device;
   obtaining an encrypted location of the field equipment from the encoded symbol; and
   decrypting the location of the field equipment using the private key.

3. The method of claim 1, wherein determining by the processor a location of the computing device based on geolocation information comprises receiving by the processor the location of the computing device based on geolocation information in response to a successful authentication operation.

4. The method of claim 1, wherein enabling functionality of the computing device to interact with the field equipment in response to verifying the location of the field equipment comprises enabling one or more augmented reality (AR) functions of the computing device to interact with the field equipment in response to verifying the location of the field equipment.

5. The method of claim 1, wherein enabling functionality of the computing device to interact with the field equipment in response to verifying the location of the field equipment comprises receiving from a network computing device information about one or more components of the field equipment that enables the processor to interact with the field equipment.

6. The method of claim 1, wherein enabling functionality of the computing device to interact with the field equipment in response to verifying the location of the field equipment comprises receiving from a network computing device one or more diagnostic tools that enable the processor to interact with the field equipment.

7. The method of claim 1, wherein enabling functionality of the computing device to interact with the field equipment in response to verifying the location of the field equipment comprises receiving from a network computing device a signal that unlocks one or more procedures that enable the processor to interact with the field equipment.

8. The method of claim 1, further comprising performing by the processor one or more interactions with the field equipment to perform a diagnostic operation or a maintenance operation on the field equipment.

9. The method of claim 1, further comprising sending by the processor to a network computing device an indication of an interaction between the processor and the field equipment configured to enable the network computing device to update a record related to the field equipment.

10. A computing device, comprising:
    a processor configured with processor-executable instructions to perform operations comprising:
       determining a location of field equipment based on information obtained by the processor proximate to the field equipment, wherein determining a location of field equipment based on information obtained by the processor proximate to the field equipment comprises determining by the processor a location of field equipment represented in an encoded symbol that is proximate to the field equipment and that is scanned by the computing device;
       determining a location of the computing device based on geolocation information, wherein the geolocation information is different from the information obtained by the processor proximate to the field equipment;
       determining whether the location of the field equipment based on information obtained by the processor proximate to the field equipment and the location of the computing device based on geolocation information are within a threshold distance to one another;
       verifying the location of the field equipment in response to determining that the location of the field equipment based on information obtained by the processor proximate to the field equipment and the location of the computing device based on geolocation information are within the threshold distance; and
       enabling functionality of the computing device to interact with the field equipment in response to verifying the location of the field equipment.

11. The computing device of claim 10, wherein the processor is configured with processor-executable instructions to perform operations such that determining a location of field equipment represented in an encoded symbol that is proximate to the field equipment and that is scanned by the computing device comprises:
    obtaining a private key stored in a memory of the computing device;
    scanning the encoded symbol using a camera of the computing device;
    obtaining an encrypted location of the field equipment from the encoded symbol; and
    decrypting the location of the field equipment using the private key.

12. The computing device of claim 10, wherein the processor is configured with processor-executable instructions to perform operations such that determining a location of the computing device based on geolocation information comprises receiving the location of the computing device based on geolocation information in response to a successful authentication operation.

13. The computing device of claim 10, wherein the processor is configured with processor-executable instructions to perform operations such that enabling functionality of the computing device to interact with the field equipment in response to verifying the location of the field equipment comprises enabling one or more augmented reality (AR) functions of the computing device to interact with the field equipment in response to verifying the location of the field equipment.

14. The computing device of claim 10, wherein the processor is configured with processor-executable instructions to perform operations such that enabling functionality of the computing device to interact with the field equipment in response to verifying the location of the field equipment comprises receiving from a network computing device information about one or more components of the field equipment that enables the processor to interact with the field equipment.

15. The computing device of claim 10, wherein the processor is configured with processor-executable instructions to perform operations such that enabling functionality of the computing device to interact with the field equipment in response to verifying the location of the field equipment comprises receiving from a network computing device one or more diagnostic tools that enable the processor to interact with the field equipment.

16. The computing device of claim 10, wherein the processor is configured with processor-executable instructions to perform operations such that enabling functionality of the computing device to interact with the field equipment in response to verifying the location of the field equipment comprises receiving from a network computing device a signal that unlocks one or more procedures that enable the processor to interact with the field equipment.

17. The computing device of claim 10, wherein the processor is configured with processor-executable instructions to perform operations further comprising performing one or more interactions with the field equipment to perform a diagnostic operation or a maintenance operation on the field equipment.

18. The computing device of claim 10, wherein the processor is configured with processor-executable instructions to perform operations further comprising sending to a network computing device an indication of an interaction between the processor and the field equipment configured to enable the network computing device to update a record related to the field equipment.

19. A non-transitory processor-readable medium having stored thereon processor-executable instruction configured to cause a processor of a computing device to perform operations comprising:
   determining a location of field equipment based on information obtained by the processor proximate to the field equipment, wherein determining a location of field equipment based on information obtained by the processor proximate to the field equipment comprises determining a location of field equipment represented in an encoded symbol that is proximate to the field equipment and that is scanned by the computing device;
   determining a location of the computing device based on geolocation information, wherein the geolocation information is different from the information obtained by the processor proximate to the field equipment;
   determining whether the location of the field equipment based on information obtained by the processor proximate to the field equipment and the location of the computing device based on geolocation information are within a threshold distance to one another;
   verifying the location of the field equipment in response to determining that the location of the field equipment based on information obtained by the processor proximate to the field equipment and the location of the computing device based on geolocation information are within the threshold distance; and
   enabling functionality of the computing device to interact with the field equipment in response to verifying the location of the field equipment.

20. The non-transitory processor-readable medium of claim 19, wherein the stored processor-executable instructions are configured to cause a processor of a computing device to perform operations such that determining a location of field equipment represented in an encoded symbol that is proximate to the field equipment and that is scanned by the computing device comprises:
   obtaining a private key stored in a memory of the computing device;
   scanning the encoded symbol using a camera of the computing device;
   obtaining an encrypted location of the field equipment from the encoded symbol; and
   decrypting the location of the field equipment using the private key.

21. The non-transitory processor-readable medium of claim 19, wherein the stored processor-executable instructions are configured to cause a processor of a computing device to perform operations such that determining a location of the computing device based on geolocation information comprises receiving the location of the computing device based on geolocation information in response to a successful authentication operation.

22. The non-transitory processor-readable medium of claim 19, wherein the stored processor-executable instructions are configured to cause a processor of a computing device to perform operations such that enabling functionality of the computing device to interact with the field equipment in response to verifying the location of the field equipment comprises enabling one or more augmented reality (AR) functions of the computing device to interact with the field equipment in response to verifying the location of the field equipment.

23. The non-transitory processor-readable medium of claim 19, wherein the stored processor-executable instructions are configured to cause a processor of a computing device to perform operations such that enabling functionality of the computing device to interact with the field equipment in response to verifying the location of the field equipment comprises receiving from a network computing device information about one or more components of the field equipment that enables the processor to interact with the field equipment.

24. The non-transitory processor-readable medium of claim 19, wherein the stored processor-executable instructions are configured to cause a processor of a computing device to perform operations such that enabling functionality of the computing device to interact with the field equipment in response to verifying the location of the field equipment comprises receiving from a network computing device one or more diagnostic tools that enable the processor to interact with the field equipment.

25. The non-transitory processor-readable medium of claim 19, wherein the stored processor-executable instructions are configured to cause a processor of a computing device to perform operations such that enabling functionality of the computing device to interact with the field equipment in response to verifying the location of the field equipment comprises receiving from a network computing device a signal that unlocks one or more procedures that enable the processor to interact with the field equipment.

26. The non-transitory processor-readable medium of claim 19, wherein the stored processor-executable instructions are configured to cause a processor of a computing device to perform operations further comprising performing one or more interactions with the field equipment to perform a diagnostic operation or a maintenance operation on the field equipment.

27. The non-transitory processor-readable medium of claim 19, wherein the stored processor-executable instructions are configured to cause a processor of a computing device to perform operations further comprising sending to a network computing device an indication of an interaction between the processor and the field equipment configured to enable the network computing device to update a record related to the field equipment.

* * * * *